United States Patent [19]

Bourland

[11] 4,388,443
[45] Jun. 14, 1983

[54] MOLDABLE POLYBLENDS

[75] Inventor: Larry G. Bourland, Downingtown, Pa.

[73] Assignee: Atlantic Richfield Company, Los Angeles, Calif.

[21] Appl. No.: 350,516

[22] Filed: Feb. 19, 1982

[51] Int. Cl.$^3$ .................. C08L 69/00; C08L 67/04
[52] U.S. Cl. .................................... 525/67; 525/92; 525/146; 525/148; 264/176 R; 264/328.14; 264/328.16
[58] Field of Search ............... 525/92, 67, 146, 415, 525/148; 264/328.16, 328.14

[56] References Cited

U.S. PATENT DOCUMENTS

| | | | |
|---|---|---|---|
| 3,892,821 | 7/1975 | Koleske et al. | 525/415 |
| 3,919,354 | 11/1975 | Moore et al. | 525/244 |
| 3,966,842 | 6/1976 | Ludwig et al. | 525/92 |

*Primary Examiner*—Theodore E. Pertilla

[57] ABSTRACT

Disclosed are moldable polyblends comprising a polylactone, a polycarbonate and a rubber-modified styrenic copolymer.

9 Claims, No Drawings

MOLDABLE POLYBLENDS

This invention relates to moldable polyblends.

In one of its more specific aspects, this invention pertains to a moldable polyblend comprising a polylactone, a polycarbonate and a rubber-modified styrenic copolymer.

The incompatibility of homopolymers with one another and with copolymers is well established. There are few polymers that are totally or even partially miscible with one another; most plastic materials are incompatible or immiscible when an attempt is made to prepare a uniform or homogeneous blend by mixing two or more such polymers. Moreover, this general rule of incompatibility of polymers serves to limit the ability of molders to tailor polyblends for needed end use physical property values.

Accordingly, it is the object of this invention to provide a moldable polyblend which can be formulated to provide molded articles which have tailored toughness.

According to this invention, there is provided a moldable polyblend comprising a polylactone, a polycarbonate and a rubber-modified copolymer of styrene and maleic anhydride.

Also, according to this invention there is provided a method of producing a molded polyblend which comprises forming a polyblend comprising a polylactone, a polycarbonate and a rubber-modified copolymer of styrene and maleic anhydride, and molding the polyblend.

Any suitable polylactone can be employed in the polyblend of this invention.

Suitable polylactones include poly(beta-propiolactone), poly(gamma-butyrolactone), poly(delta-valerolactone) and poly(epsilon-caprolactone).

A particularly suitable polylactone which was employed in the examples of this invention is a poly(epsilon-caprolactone) designated "PCL-700", commercially available from Union Carbide Corporation.

In the above polyblend, polylactone can be employed in an amount within the range of from about 1 to about 10 weight percent of the polyblend. Preferably, the polyblend will contain from about 2 to about 5 weight percent polylactone.

Any suitable polycarbonate can be employed in the polyblend of this invention.

Suitable polycarbonates and methods for their production are taught in U.S. Pat. Nos. 3,028,365, 3,334,154 and 3,915,926, the teachings of which are incorporated herein by reference.

One particularly suitable polycarbonate which was employed in the examples of this invention is designated Merlon ® M-50 polycarbonate, commercially available from Mobay Chemical Corporation.

The polyblend can contain from about 1 to about 98 weight percent polycarbonate. Preferably, the polyblend will contain from about 5 to about 70 weight percent.

The polyblend can contain from about 1 to about 98 weight percent rubber-modified, styrene-maleic anhydride copolymer, the rubber being at least about 15 weight percent of the copolymer. Preferably, the polyblend will contain from about 25 to about 93 weight percent rubber-modified, styrene-maleic anhydride copolymer.

Any suitable rubber-modified, styrene-maleic anhydride copolymer can be employed in the polyblend of this invention.

Suitable for use are rubber-modified, styrene-maleic anhydride copolymers produced according to the method described in U.S. Pat. No. 3,919,354 to Moore et al.

Rubber-modified, styrene-maleic anhydride copolymers particularly well suited for use in the polyblend of this invention are designated Dylark ® 250 copolymer, Dylark ® 350 copolymer and Dylark ® 700 copolymer, all commercially available from ARCO Chemical Company, Division of Atlantic Richfield Company.

The moldable polyblend of this invention can be prepared using any art-recognized method for blending polymers. For example, the polymers can be dry blended at room temperature followed by melt mixing at a temperature above the softening points of the polymers using any conventional melt mixing apparatus, including extruders, calenders, kneaders and the like.

The moldable polyblend of this invention is suitable for use to produce molded articles using conventional molding apparatus. As such, the polyblend can comprise optional art-recognized additives such as pigments, fillers, stabilizers, fire retardants, lubricants and the like.

The following examples serve to further demonstrate how to make and use the invention.

EXAMPLES

This following examples demonstrate the preparation of moldable polyblends of this invention and further set forth a comparison between five "control" polyblends and those of the invention, based on Gardner Falling Weight Impact property values after molding.

In each instance, the polyblend was prepared by dry blending all ingredients at room temperature followed by melt blending at 525° F. using an extruder.

Each polyblend (plus the rubber-modified, styrene-maleic anhydride copolymer control) was subsequently injection molded into a 2"×3½" diameter, ⅛" thick sample employing a molding pressure of approximately 10,000 psi at a platen temperature of approximately 140° F. with an injection cycle time of approximately 30 seconds.

All molded samples were tested for toughness according to the Gardner Falling Weight Impact test procedure using a 1¼" diameter orifice and a ½" diameter punch.

Impact data for each sample and the specific polyblend formulations employed in each instance, are presented in Table I, below.

TABLE I

| Polyblend Formulation | | | | CONTROLS Weight Percent | | | | | |
|---|---|---|---|---|---|---|---|---|---|
| Example No. | | | | I | II | III | IV | V | |
| Polylactone[1] | 0 | 2 | 5 | 0 | 0 | 2 | 2 | 3.5 | 5 | 5 |
| Polycarbonate[2] | 0 | 0 | 0 | 15 | 30 | 15 | 30 | 22.5 | 15 | 30 |
| Rubber-Modified, Styrene/Maleic Anhydride Copolymer[3] | 100 | 98 | 95 | 85 | 70 | 83 | 68 | 74 | 80 | 65 |
| Property | | | | | | | | | | |

TABLE I-continued

| Polyblend Formulation | | | | | CONTROLS Weight Percent | | | | |
|---|---|---|---|---|---|---|---|---|---|
| Example No. | | | | | I | II | III | IV | V |
| Impact Strength (inch-pounds) | 160 | 160 | 168 | 144 | 216 | 232 | 304 | 240 | 248 | 312 |

[1] PCL 700 poly(epsilon-caprolactone) - Union Carbide Corporation.
[2] Merlon ® M-50 polycarbonate - Mobay Chemical Corporation.
[3] Dylark ® 700 copolymer - ARCO Chemical Company, Division of Atlantic Richfield Company.

It will be seen from the above that the molded polyblends of this invention which comprise a polylactone, a polycarbonate and a rubber-modified, styrene-maleic anhydride copolymer exhibit excellent toughness as indicated by impact strength. It will also be noted that the moldable polyblends of this invention facilitate the manufacture of molded articles exhibiting varying degrees of toughness depending on the formulation of the polyblend.

It will be evident from the foregoing that various modifications can be made to this invention. Such, however, are considered as being within the scope of the invention.

What is claimed is:

1. A moldable polyblend comprising a polylactone, a polycarbonate and a rubber-modified copolymer of styrene and maleic anhydride wherein said polylactone is employed in an amount within the range of from about 1 to about 10 weight percent of the polyblend.

2. The polyblend of claim 1 in which said polylactone is employed in an amount within the range of from about 2 to about 5 weight percent of the polyblend.

3. the polyblend of claim 1 in which said polycarbonate is employed in an amount within the range of from about 1 to about 98 weight percent of the polyblend.

4. The polyblend of claim 1 in which said polycarbonate is employed in an amount within the range of from about 5 to about 70 weight percent of the polyblend.

5. The polyblend of claim 1 in which said rubber-modified copolymer of styrene and maleic anhydride is employed in an amount within the range of from about 1 to about 98 weight percent of the polyblend.

6. The polyblend of claim 1 in which said rubber-modified copolymer of styrene and maleic anhydride is employed in an amount within the range of from about 25 to about 93 weight percent of the polyblend.

7. The polyblend of claim 5 or 6 in which said rubber-modified, styrene-maleic anhydride copolymer comprises at least 15 weight percent rubber.

8. A method of producing a molded polyblend which comprises:
   (a) forming a polyblend comprising a polylactone, a polycarbonate and a rubber-modified copolymer of styrene and maleic anhydride wherein said polylactone is employed in an amount within the range of from about 1 to 10 weight percent of the polyblend; and
   (b) molding the polyblend.

9. A molded polyblend produced according to the method of claim 8.

* * * * *